United States Patent [19]

Yamada et al.

[11] Patent Number: 4,954,920
[45] Date of Patent: Sep. 4, 1990

[54] THIN FILM MAGNETIC HEAD

[75] Inventors: Kazuhiko Yamada; Takao Maruyama, both of Tokyo, Japan

[73] Assignee: NEC Corporation, Japan

[21] Appl. No.: 126,577

[22] Filed: Nov. 30, 1987

[30] Foreign Application Priority Data

Nov. 28, 1986 [JP] Japan ................................ 61-284784
Nov. 28, 1986 [JP] Japan ................................ 61-284785
Nov. 28, 1986 [JP] Japan ................................ 61-284787

[51] Int. Cl.5 .......................... G11B 5/127; G11B 5/33
[52] U.S. Cl. ..................................................... 360/113
[58] Field of Search ...................... 360/113; 338/32 R

[56] References Cited

U.S. PATENT DOCUMENTS 4,388,662 6/1983 Jeffers et al. ........................ 360/113
4,425,593 1/1984 Postma ................................ 360/113
4,652,945 3/1987 Marchant ........................ 360/113 X Primary Examiner—John H. Wolff
Attorney, Agent, or Firm—Laff, Whitesel, Conte & Saret

[57] ABSTRACT

A thin film magnetic head has a layer of soft magnetic material formed on a substrate. The layer is formed into two yoke pieces and a magnetic return path, which form a gap at ends of the yoke pieces. The opposite ends of the yoke pieces are joined to the magnetic return path by overlaying magneto-resistive pieces to which an electrical bias is applied.

1 Claim, 4 Drawing Sheets

THIN FILM MAGNETIC HEAD

BACKGROUND OF THE INVENTION

The present invention relates to a thin film magnetic head which may be used in a magnetic reading and recording apparatus such as a magnetic disk drive, a magnetic tape drive, and so on. More particularly, it relates to a thin film magnetic head employing a magneto-resistive (MR) element which is manufactured by a use of the thin film forming technology.

The thin film magnetic head employing the magneto-resistive (MR) element is disclosed in Japanese Patent Disclosure No. 150315/1976. As shown in FIG. 7, the convention thin film magnetic head includes a substrate 301 on which a pair of yokes 302 and 303 of a high permeability soft magnetic material are formed via a insulative layer 341, the formation being by the thin film forming technology. One ends of the pair of yokes 302 and 303 form a gap 308 which generates a magnetic flux to be applied to a magnetic medium 309. The other ends of the yokes are magnetically connected by a high permeability, soft magnetic material (return path) 306 and the MR element 305. The MR element 305 has contacts 323 and 324 to supply a drive current thereto during a reading operation. The yokes 302 and 303 are provided with coils 311 and 312 to which a recording current is applied through contacts 321 and 322.

In the conventional thin film magnetic head, the track width W is determined by the thickness of the yoke. Accordingly, the track width can easily be reduced by decreasing the thickness of the yoke in order to obtain high recording density. However, the direction of the easy axis of magnetization of the MR element 305 is the same as the longitudinal direction of the MR element 305. Since the magnetic flux flows along the longitudinal direction of the MR element 305, the domain walls are generated in the MR element so that Barkhausen noise is produced in the output signal of the MR element 305 to degrade the signal/noise ratio of the output signal. Further, since the direction of the easy axis of magnetization of the yokes 302 and 303 and the return path is arbitrary, the magnetic flux does not efficiently flow through the yokes 302 and 303 and the return path. As a result, the output signal of the MR element 305 is not sufficiently strong.

SUMMARY OF THE INVENTION

Accordingly, an object of the present invention is to provide a thin film magnetic head having a high electromagnetic transducing efficiency.

Another object of the present invention is to provide a thin film magnetic head which is capable of producing an output signal having reduced noise.

A thin film magnetic head according to the present invention comprises a pair of yokes made of magnetically permeable film. A thickness of the yokes defines a track width of the thin film magnetic head. A space between first ends of the pair of yokes define a magnetic gap of the thin film magnetic head. The second ends of the pair of yokes are apart from each other. A pair of magneto-resistive elements magnetically connected to the second ends of the pair of yokes, respectively. A return path is made of magnetically permeable film, the return path magnetically connecting the pair of magneto-resistive elements.

BRIEF DESCRIPTION OF THE DRAWINGS

FIG. 7 is a perspective view showing a conventional thin film magnetic head.

DESCRIPTION OF THE PREFERRED EMBODIMENTS

Figure 1:
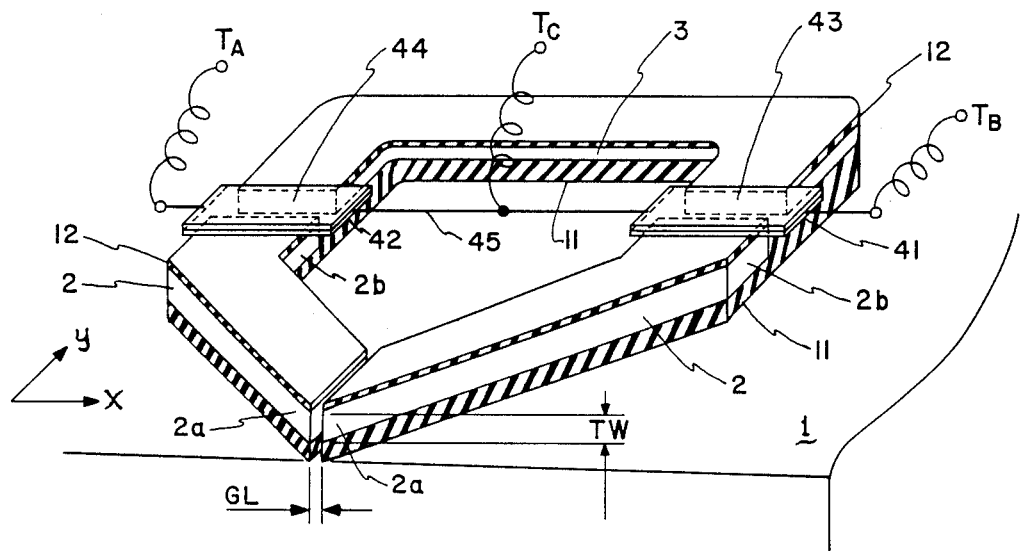
FIG. 1 is a perspective view showing a thin film magnetic head according to a first embodiment of the present invention.

FIG. 1 schematically shows a thin film magnetic head according to a first embodiment of the present invention. The magnetic head includes a substrate 1 made of non-magnetic material such as $Al_2O_3$—TiC. An insulative layer 11 of silicon oxide, which is about 10 $\mu$m thick, is formed on the substrate 1, by sputtering. A pair of yokes 2 are formed on the insulative layer 11. The yokes 2 are made of a soft magnetic material having a high magnetic permeability such as $Co_{90}Zr_{10}$ (weight percent), whose thickness TW is 2 $\mu$m. The thickness TW defines a track width of the magnetic head. The yokes 2 are formed by first sputtering the Co—Zr alloy within the magnetic filed having the x-direction in FIG. 1, and then, by etching the Co—Zr layer to form an L-shaped configulation. Accordingly, the magnetic anisotropy (the easy axis of magnetization) of the yokes 2 is directed in the x-direction. A distance between one ends 2a of the yokes 2 defines a magnetic gap having a value which is about 0.5 $\mu$m. A magnetic recording medium is applied to face the magnetic gap and to move relative to the magnetic head in the x-direction.

A U-shaped return path 3 is formed on the insulative layer 11 in a manner which is similar to the manner in which the yokes 2 are formed, so that both ends of the return path 3 are faced to and apart from the other ends 2b of the yokes 2. The return path 3 is also made of a $Co_{90}Zr_{10}$ alloy, and the thickness thereof being 2 $\mu$m. It should be noted that the Co—Zr alloy is sputtered to form the return path 3 within a magnetic field having the y-direction of FIG. 1 so that the magnetic anisotropy of the return path 3 is directed in the y-direction.

The upper surface of the yokes 2 and the return path 3 and the spaces between the yokes 2 and the return path 3 are covered by an insulative layer 12 of silicon oxide which is applied by sputtering. The surface of the insulative layer 12 is made into a plane.

A pair of magneto-resistive (MR) elements 41 and 42 are formed on the insulative layer 12 at a position which is above the other ends 2b of the yokes 2 and the ends of the return path 3. Elements 41, 42 are formed by evaporating so that the MR elements 41 and 42 are magnetically connected to the yokes 2 and the return path 3. The MR elements 41 and 42 are made of $Ni_{81}Fe_{19}$ (atomic percent) alloy, their thickness being 0.03 $\mu$m. A pair of hard magnetic materials 43 and 44 made of $Co_{70}Pt_{30}$ (atomic percent) alloy are formed on the MR elements 41 and 42 for magnetically biasing the MR elements 41 and 42. The hard magnetic materials 43 and 44 enable the magnetic vector of the MR elements 41 and 42 to have an angle of 45° with respect to the flowing direction of the bias current which is applied to the MR elements 41 and 42. The thickness of the hard magnetic materials 43 and 44 are favorably about 0.045 μm.

As schematically shown, the MR elements 41 and 42 are connected to respective electrical contacts $T_B$ and $T_A$ to which the bias current is supplied. Further, the MR elements 41 and 42 are electrically connected to one another by a conductor 45 such as Au and Cu. An intermediate terminal $T_C$ is connected to the conductor 45.

Figure 2:
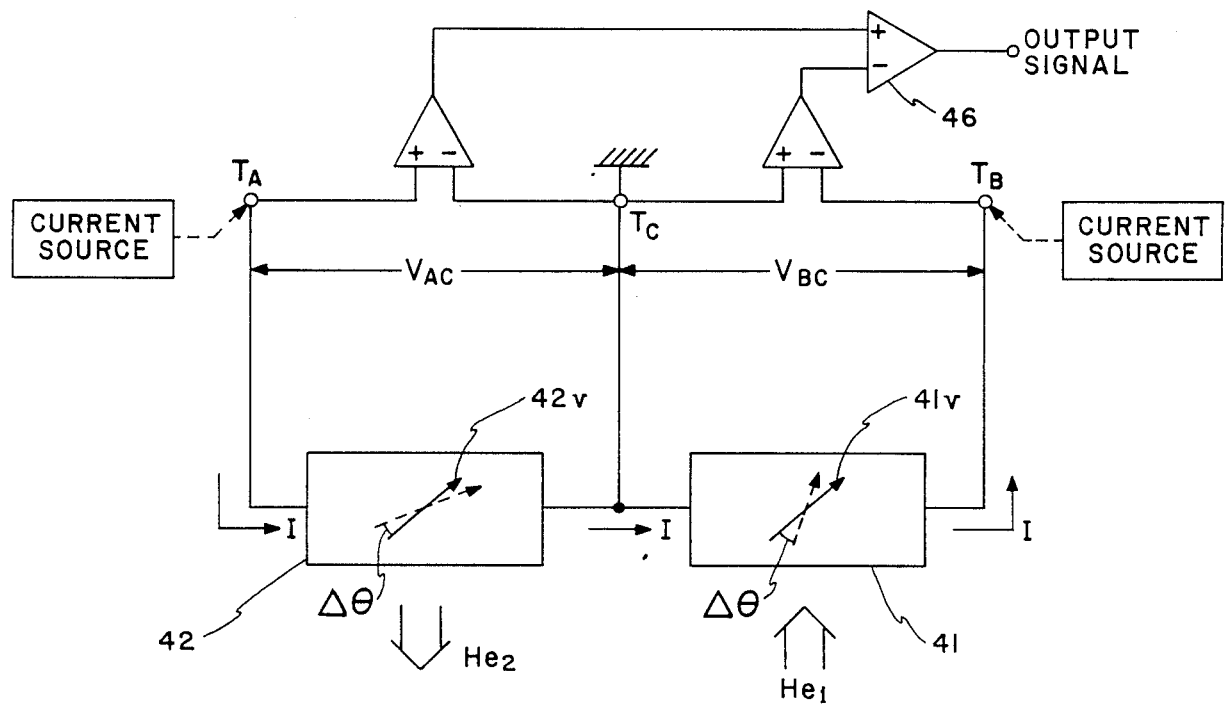
FIGS. 2 and 3 show an operation of MR elements used in the thin film magnetic head shown in FIG. 1.

As shown in FIG. 2, a positive voltage is applied to the contact $T_A$. A negative voltage is applied to the contact $T_B$ so that the constant bias or sense current I is supplied to the MR elements 41 and 42. The intermediate terminal $T_C$ is grounded. The magnetic vectors $41v$ and $42v$ in the MR elements 41 and 42 have an angle of 45° with respect to the direction of the current I as shown by the solid arrow.

When the magnetic flux from a magnetic recording medium, such as a magnetic disk or a magnetic tape, is applied to the one ends 2a (FIG. 1) of the yokes 2, the magnetic flux flows through the right side yoke 2, the return path 3, and the left side yoke 2. Accordingly, the MR element 41 is supplied with a magnetic field $He_1$ (FIG. 2) so that the magnetic vector $41v$ is rotated counterclockwise by an angle $\Delta\theta$ as shown by a dashed lines arrow in FIG. 2. That is, the resistance of the MR element 41 is decreased by $\Delta R$. On the other hand, the MR element 42 is supplied with a magnetic field $He_2$ in a direction which is opposite to the magnetic field $He_1$. Accordingly, the magnetic vector $42v$ is rotated clockwise by an angle $\Delta\theta$, as shown by a dashed line arrow. The resistance of the MR element 42 is increased by $\Delta R$.

In response to the change of the resistance of the MR elements 41 and 42, the voltages $V_{AC}$ and $V_{BC}$ between the contact $T_A$ and the terminal $T_C$ and between the terminal $T_C$ and the contact $T_B$, respectively, are reversely changed. A differential amplifier 46 detects the difference voltage between the voltages $V_{AC}$ and $V_{BC}$ to produce an output signal (=reading signal) having a value of $2 \cdot \Delta R \cdot I$ which is twice the value obtained by only one MR element. Even if an undesired magnetic flux is applied to the MR elements 41 and 42, the changes of the voltages $V_{AC}$ and $V_{BC}$ due to the undesired magnetic flux are the same polarity. Therefore, the changes cancel each other in the differential amplifier 46. Additionally, even if the resistance of the MR elements 41 and 42 are changed due to a thermal change, the change of the voltages $V_{AC}$ and $V_{BC}$ due to the thermal change also cancel each other. Accordingly, the noise in the output signal is greatly reduced.

Figure 3:
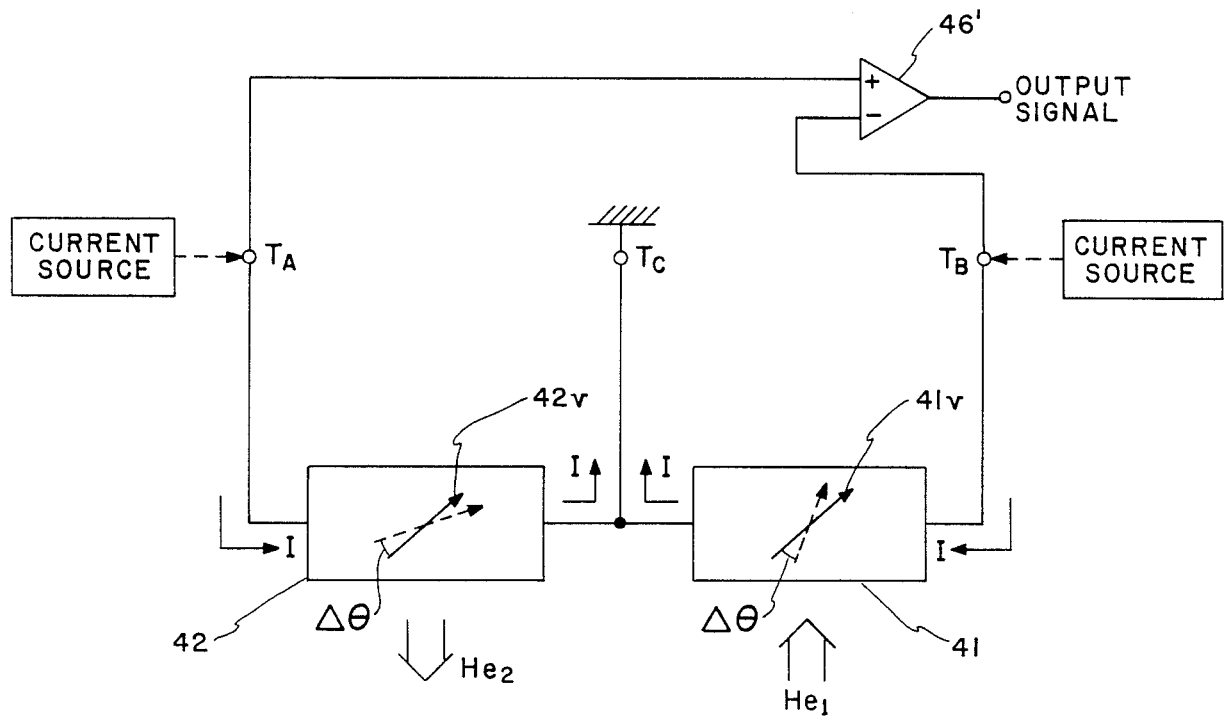

FIG. 3 shows an another example of the electrical connection in the case where the bias current I is applied to the MR elements 41 and 42 in opposite directions, with respect to each other. The constant bias current I flows from the contacts $T_A$ and $T_B$ to the terminal $T_C$ via the MR elements 42 and 41, respectively. In this case, a differential amplifier 46' is directly connected to the contacts $T_A$ and $T_B$.

Since the magnetic anisotropy of the yokes 2 is directed to the x-direction and that of the return path 3 is directed to the y-direction in FIG. 1, the magnetic flux flows through the yokes 2 (FIG. 1) and the return path 3 perpendicularly to the magnetic anisotropy. Accordingly, the movement of the magnetic flux is carried out by the rotation of the magnetic vector so that the magnetic head can operate in a relatively high frequency and high electro-magnetic efficiency. In other words, the output signal of the magnetic head is not degraded.

Figure 4:
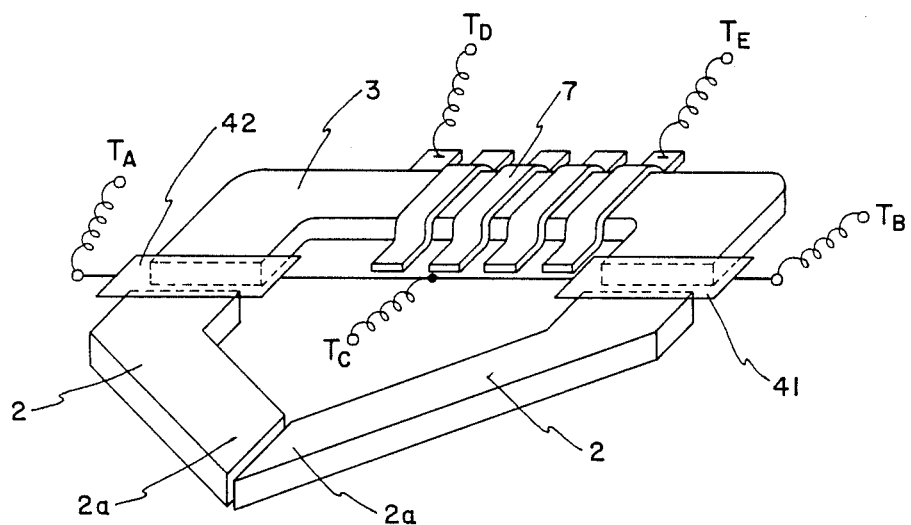
FIG. 4 is a perspective view schematically showing a thin film magnetic head according to a second embodiment of the present invention.

A thin film magnetic head according to a second embodiment of the present invention is shown in FIG. 4 in which the same elements bear the same reference numerals as in FIG. 1. For the purpose of illustration, the substrate 1, the insulative layers 11 and 12 and the hard magnetic materials 43 and 44 are omitted in FIG. 4.

Around the return path 3, there is provided a coil 7 made of about 1 μm thick Cu. The coil 7 is formed by plating using a photoresist pattern. As is well known in the art, the coil 7 includes a lower portion and an upper portion relative to the return path 3. Each of the ends of the coil 7 are connected to respective terminals $T_D$ and $T_E$ to which recording current is applied. When the recording current is applied, the magnetic flux is generated along the yokes 2 and the return path 3. The magnetic flux is used for recording information onto a recording medium at the ends 2a of the yokes 2 as disclosed in previously described Japanese Patent Disclosure No. 150315/1976.

Figure 5A:
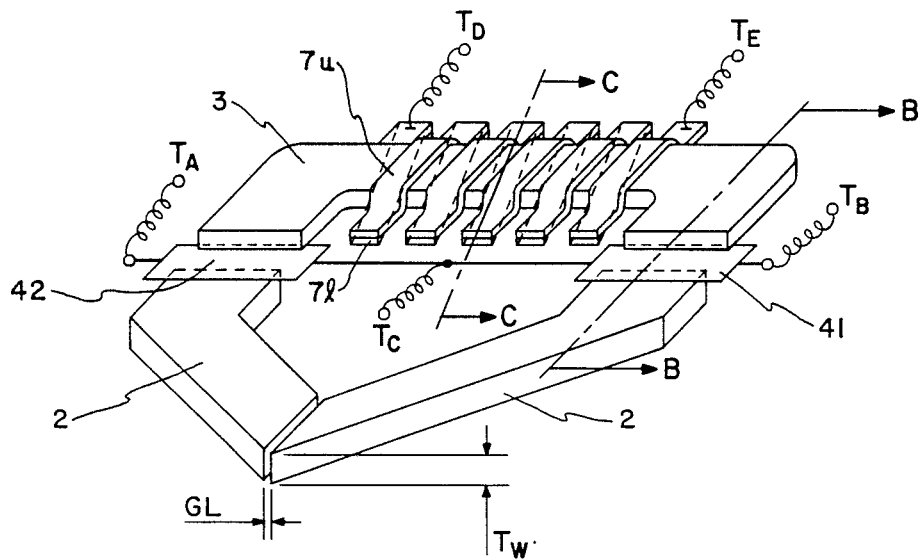
FIGS. 5A to 5C are a perspective view and two cross-sectional views showing a thin film magnetic head according to a third embodiment of the present invention.

FIG. 5A schematically shows a third embodiment of the present invention. The difference between the second and third embodiments is that the return path 3 is formed on a plane which is different from the plane where the yokes 2 are formed. In FIG. 5A, the substrate 1, the insulative layers 11 and 12 and the hard magnetic materials 43 and 44 are omitted for the purpose of illustration.

Figure 5B:
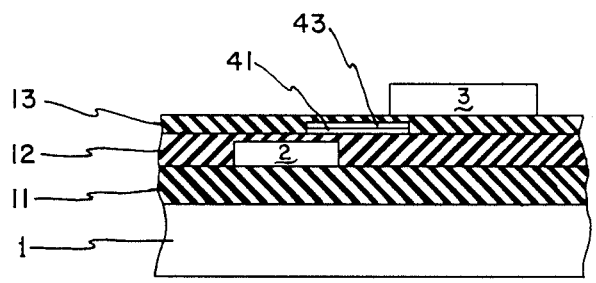

FIG. 5B is a cross-sectional view taken alone a line B—B of FIG. 5A. The yoke 2 is formed on the insulative layer 11, which is the same as the first embodiment. The yoke 2 is covered by the next insulative layer 12. Then the MR element 41 and the hard magnetic material 43 are formed such that one edge of the MR element 41 is overlapped to the yoke 2. The MR element 41 and the material 43 are covered by an insulative layer 13 made of 0.5 μm thick silicon oxide ($SiO_2$).

Figure 5C:
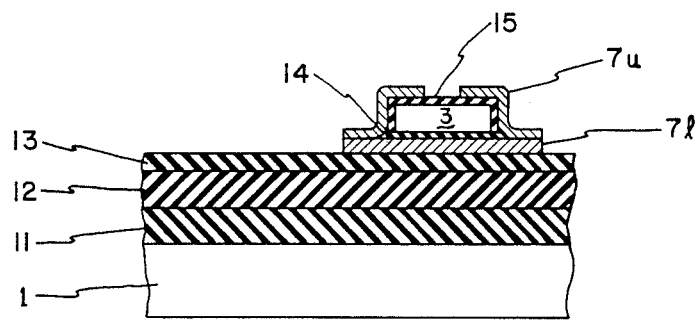

FIG. 5C is a cross-sectional view taken along a line C—C of FIG. 5A. A lower coil pattern $7l$ is formed on the insulative layer 13 at the position where the central portion of the return path 3 is to be formed. The lower coil pattern $7l$ is made of Cu and formed by through a hall plating method, to a thickness of 2 μm. Then, an insulative layer 14 of silicon oxide is formed on the lower coil pattern $7l$ about 0.5 μm thick, which is enough to insulate an electrical connection between the lower coil pattern $7l$ and the return path 3.

Next, the return path 3 is formed in a similar manner on the first embodiment such that the central portion thereof is on the insulative layer 14 and both ends thereof are on the insulative layer 13. Both ends of the return path 3 are overlapped by the MR elements 41 so that the yoke 2, the MR elements 41 and 42 and the return path 3 are magnetically connected as shown in FIG. 5B. The upper surface of the return path 3 is covered by an insulative layer 15 made of silicon oxide of 0.5 μm thick.

The insulative layers 14 and 15 located above the both ends of the lower coil pattern $7l$ are removed by an etching method using a desired resist pattern in order to obtain an electrical contact between the lower and an upper coil patterns $7l$ and $7u$. The upper coil pattern $7u$ made of Cu, is then formed on the insulative layer 15 in the same manner that the lower coil pattern 7*l* is formed. The lower and upper coil patterns 7*l* and 7*u* form a continuous coil wound around the return path 3.

In the third embodiment, the both ends of the lower coil pattern 7*l* are covered by the insulative layers 14 and 15 each having a thickness of 0.5 μm. Accordingly, the etching for exposing the both ends of the lower coil pattern 7*l* is required to remove only the 1 μm thick insulative layers 14 and 15.

In contrast, in the second embodiment, the etching is required to remove the insulative layer which is about 3 μm thick since the return path 3 is embedded by the insulative layer 12 of 2.5 μm thick and the insulative layer of 0.5 μm thick which is provided between the lower coil pattern and the return path 3. Specifically, about 18 to 40 minutes are required for the etching in the third embodiment while 50 to 120 minutes are required in the second embodiment.

Figure 6:
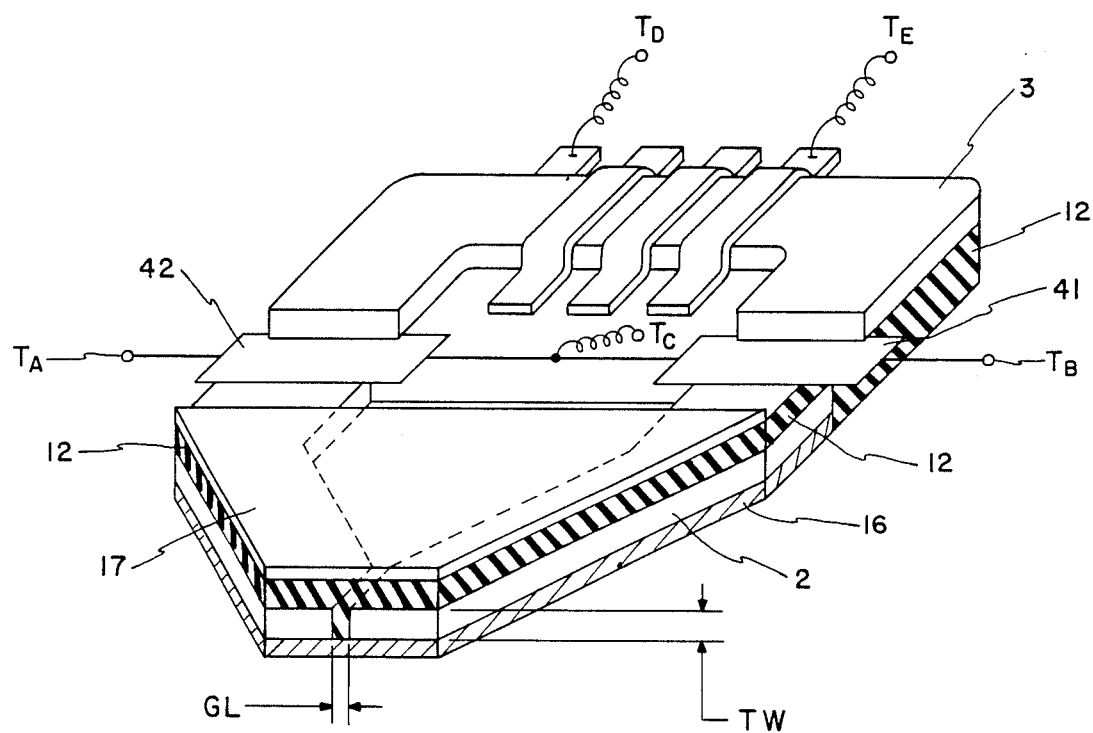
FIG. 6 is a perspective view schematically showing a thin film magnetic head according to a fourth embodiment of the present invention.

FIG. 6 schematically shows a fourth embodiment of the present invention in which the substrate 1, the insulative layers 11, 13, 14 and 15 and the hard magnetic materials 42 and 43 are omitted for the purpose of illustration.

The difference found in the third embodiment is that first and second shield layers 16 and 17 are additionally provided on lower and upper portions of the yokes 2. The first shield layer 16 is made of a 3 μm thick Cu—Al alloy and formed on the insulative layer 11 by sputtering, before the yokes 2 are formed. A Co—Zr alloy layer is formed directly on the first shield layer 16 and etched together with the first shield layer 16 so as to form the yokes 2. The first shield layer 16 and the yokes 2 are embeded by the insulative layer 12, and then, the surface of the insulative layer 12 is made plane by etching within an atmosphere of argon gas. After that, the second shield layer 17 of a Cu—Al alloy is formed on the insulative layer 12 by sputtering by about 3 μm thick. The second shield layer 17 is shaped into a trapezoid to cover the front portion of the yokes 2. Subsequentially, the MR elements 41 and 42, the lower coil pattern 7*l*, the return path 3, the upper coil pattern 7*u*, the insulative layers therebetween, and so on are formed in a manner which is the same as the manner used in the third embodiment.

In the fourth embodiment, the first and second shield layers 16 and 17, made of conductive material, prevent the yokes 2 from being subjected to magnetic flux from the adjacent tracks of a recording during the reading operation. Similarly, the shield layers 16 and 17 prevent the magnetic flux generated by the yokes 2 from affecting the adjacent tracks during the recording operation. Accordingly, a higher track density can surely be obtained as compared to the density obtained by the previous embodiments.

In the second to fourth embodiments, the coil 7 is formed around the return path 3. However, the coil 7 may be formed around the yokes 2. Further, although Co—Zr alloy is used for the yokes 2 and the return path, the other soft magnetic material can also be used. Moreover, aluminum oxide or other insulative material can be used as the insulative layers.

What is claimed is:

1. A thin film magnetic head for reading recorded information from a magnetic recording medium which is moving in a first direction relative to said thin film magnetic head, said thin film magnetic head comprising:
a pair of yokes made of a magnetically permeable film having a predetermined thickness, said pair of yokes being formed on a substrate and covered by a first insulative layer, said thickness of said yokes defining a track width of said thin film magnetic head, a space between first ends of said pair of yokes defining a magnetic gap of said thin film magnetic head, second ends of said pair of yokes being spaced apart from each other, a magnetic anisotropy of said pair of yokes being directed in substantially said first direction;
a pair of magneto-resistive elements magnetically connected to said second ends of said pair of yokes, respectively, said pair of magneto-resistive elements being formed on said first insulative layer and covered by a second layer,
a return path made of a magnetically permeable film, a coil surrounding said return path for supplying recording current, said return path magnetically connecting said pair of magneto-resistive elements, a magnetic anisotropy of said return path being directed in a second direction which is substantially perpendicular to said first direction, said coil including lower and upper coil patterns, said lower coil pattern being formed on said second insulative layer and covered by a third insulative layer, said return path being formed on said third insulative layer and covered by a fourth insulative layer, said upper coil pattern being formed on said fourth insulative layer, and both ends of said upper coil pattern being connected to both ends of said lower coil pattern at positions where said third and fourth insulative layers are removed.

* * * * *